(12) United States Patent
Wang et al.

(10) Patent No.: US 12,271,020 B2
(45) Date of Patent: Apr. 8, 2025

(54) DISPLAY DEVICE

(71) Applicant: TCL CHINA STAR OPTOELECTRONICS TECHNOLOGY CO., LTD., Shenzhen (CN)

(72) Inventors: Wenbin Wang, Shenzhen (CN); Lijian Xiao, Shenzhen (CN); Zhonghong Guan, Shenzhen (CN); Guanqiao Zhao, Shenzhen (CN); He Peng, Shenzhen (CN); Wenbin Lu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/767,955

(22) PCT Filed: Mar. 31, 2022

(86) PCT No.: PCT/CN2022/084272
§ 371 (c)(1),
(2) Date: Apr. 11, 2022

(87) PCT Pub. No.: WO2023/173498
PCT Pub. Date: Sep. 21, 2023

(65) Prior Publication Data
US 2024/0094458 A1 Mar. 21, 2024

(30) Foreign Application Priority Data
Mar. 15, 2022 (CN) .......................... 202210255421.3

(51) Int. Cl.
*F21V 17/00* (2006.01)
*F21V 8/00* (2006.01)

(52) U.S. Cl.
CPC ......... *G02B 6/0055* (2013.01); *G02B 6/0088* (2013.01)

(58) Field of Classification Search
CPC .... G02B 6/0088; G02B 6/005; G02B 6/0086; G02B 6/0093; G02B 6/0095;
(Continued)

(56) References Cited

U.S. PATENT DOCUMENTS 9,250,379 B2 * 2/2016 Lan .................. G02B 6/0051
2005/0259444 A1 * 11/2005 Choi .................. G02B 6/0088
362/633

(Continued)

FOREIGN PATENT DOCUMENTS

CN 104267524 A 1/2015
CN 205067925 U 3/2016
(Continued)

*Primary Examiner* — Omar Rojas Cadima
(74) *Attorney, Agent, or Firm* — Dickinson Wright PLLC

(57) ABSTRACT

The present application discloses a display device, the display device includes a frame area. The display device includes a backplate, a light guide plate, and an optical diaphragm. A receiving cavity is defined in the backplate, the light guide plate is located in the receiving cavity, the light guide plate includes at least one light guide plate extension part, the light guide plate extension part is located in the frame area, the optical diaphragm is arranged on the light guide plate, the optical diaphragm includes at least one diaphragm extension part, and the diaphragm extension part is located in the frame area. The diaphragm extension part is engaged together and connected with the light guide plate extension part.

17 Claims, 3 Drawing Sheets

(58) Field of Classification Search
CPC .. G02B 6/0055; G02B 6/0091; G02B 6/0051; G02B 6/0021; G02B 6/0025; G02B 6/0073; F21V 17/104; F21V 17/107; F21V 17/108; F21V 17/14; F21V 17/18; F21V 17/164; G02F 2201/465; G02F 2201/46; F21K 9/61; F21Y 2115/10
See application file for complete search history.

(56) References Cited

U.S. PATENT DOCUMENTS

2011/0128756 A1\* 6/2011 Cho ................ G02B 6/0088
362/613
2013/0208504 A1\* 8/2013 Huang .............. G02F 1/133608
362/609

FOREIGN PATENT DOCUMENTS

| | | |
|---|---|---|
| CN | 205210477 U | 5/2016 |
| CN | 207281428 U | 4/2018 |
| CN | 210465931 U | 5/2020 |
| CN | 211741772 U | 10/2020 |
| CN | 111965902 A | 11/2020 |
| CN | 112882290 A | 6/2021 |
| CN | 215449821 U | 1/2022 |
| JP | 2013206677 A | 10/2013 |
| JP | 2018132542 A | 8/2018 |

\* cited by examiner

DISPLAY DEVICE

CROSS-REFERENCE TO RELATED APPLICATIONS

This application is a U.S. National Stage of International Application No. PCT/CN2022/084272, filed on Mar. 31, 2022, which claims the benefit and priority of Chinese Patent Application No. 202210255421.3, filed on Mar. 15, 2022, the entire contents of which are incorporated herein by reference.

FIELD OF INVENTION

The present application relates to a field of display technology, and particularly to a display device.

DESCRIPTION OF PRIOR ART

A display can be a backlight display device. A basic structure of the display comprises a display panel and a backlight unit (BLU). The BLU mainly comprises a light source, a backplate, a light guide plate, and various optical diaphragms. In the BLU, the optical diaphragms are usually fixed on the light guide plate by bonding. In previous technologies, double-sided adhesive tape is mostly used, or the optical diaphragms are directly pressed by an adhesive frame. However, an existing problem is that it occupies an edge of the light guide plate and the optical diaphragm, which reduces an effective display area, resulting in poor display effect of the display.

Technical Problem

The embodiments of the present application provides a display device to solve the problem of reduced effective display area due to fixing of the light guide plate and the optical diaphragm in the prior art.

SUMMARY

The present application provides a display device, wherein the display device comprises a display area and a frame area arranged around the display area, comprising:
  a backplate, the backplate defined with a receiving cavity;
  a reflector, the reflector arranged in the receiving cavity;
  a light guide plate, the light guide plate located in the receiving cavity, and the light guide plate is arranged on the reflector, the light guide plate comprises a light guide plate body part and at least one light guide plate extension part connected with the light guide plate body part, the light guide plate body part is located in the display area, the light guide plate extension part is located in the frame area;
  a light source, the light source located in the receiving cavity, the light source is located between the light guide plate and the backplate, and the light source is located on the reflector, the light source is located in the frame area;
  an optical diaphragm, the optical diaphragm located in the receiving cavity, the optical diaphragm is arranged on a side of the light guide plate away from the reflector, the optical diaphragm comprises a diaphragm body part and at least one diaphragm extension part connected with the diaphragm body part, the diaphragm body part is located in the display area, the diaphragm extension part is located in the frame area, the diaphragm extension part is engaged with and connected with the light guide plate extension part; and
  a display panel, the display panel arranged on a side of the backplate away from the optical diaphragm.

Alternatively, in some embodiments of the present application, the backplate comprises a bottom plate and a plurality of side walls arranged on the bottom plate, the bottom plate is located in the display area and the frame area, the plurality of the side walls are located in the frame area, the receiving cavity is defined and surrounded by the bottom plate and the plurality of the side walls, the receiving cavity comprises at least one limiting groove, and the at least one limiting groove is defined on the side walls, the diaphragm extension part and the light guide plate extension part are located in the limiting groove.

Alternatively, in some embodiments of the present application, the light guide plate extension part is arranged with a receiving part, a side of the diaphragm extension part close to the light guide plate is arranged with a buckle engaged with the receiving part, and/or, a side of the light guide plate extension part close to the optical diaphragm is arranged with a protrusion, the diaphragm extension part is arranged with a storage part, and the protrusion is engaged with the storage part.

Alternatively, in some embodiments of the present application, the receiving part comprises at least one of a through hole and a clamping groove, and/or, the storage part comprises at least one of a through hole and a clamping groove.

Alternatively, in some embodiments of the present application, the diaphragm extension part is bent towards the light guide plate to form the buckle, or the light guide plate extension part is bent towards a side of the optical diaphragm to form the protrusion.

Alternatively, in some embodiments of the present application, a thickness of the light guide plate extension part is less than a thickness of the light guide plate body part, and a height of the limiting groove is less than a thickness of the side wall.

Alternatively, in some embodiments of the present application, each of the side walls is defined with a plurality of limiting grooves spaced apart, the light guide plate comprises a plurality of light guide plate extension parts, the plurality of the light guide plate extension parts are arranged spaced apart on a side of the light guide plate, the optical diaphragm comprises a plurality of diaphragm extension parts, and the plurality of the diaphragm extension parts are arranged spaced apart on a side of the optical diaphragm, each of the light guide plate extension parts and each of the diaphragm extension parts are engaged in one of the limiting grooves.

Alternatively, in some embodiments of the present application, each of the opposite side walls is respectively provided with one of the limiting grooves, the light guide plate comprises two light guide plate extension parts, the two light guide plate extension parts are respectively arranged on two opposite sides of the light guide plate, the optical diaphragm comprises two diaphragm extension parts, and the two diaphragm extension parts are respectively arranged on two opposite sides of the optical diaphragm, each of the light guide plate extension parts and each of the diaphragm extension parts are engaged in one of the limiting grooves.

Alternatively, in some embodiments of the present application, each of the side walls comprises a retaining wall part and supporting parts connected with the retaining wall part, the supporting part is located on a side of the retaining wall part close to the display area, and a side of the supporting part away from the bottom plate and a side of the retaining wall part away from the bottom plate form a step shape, the light source, the reflector, the optical diaphragm, and the light guide plate are arranged between the supporting part and the bottom plate, a orthographic projection of at least one of the supporting parts on the bottom plate coincides with a orthographic projection of the diaphragm extension part on the bottom plate and a orthographic projection of the light guide plate extension part on the bottom plate.

Alternatively, in some embodiments of the present application, the display panel is arranged on the supporting parts.

Accordingly, the present application further provides a display device, wherein the display device comprises a display area and a frame area arranged around the display area, comprising:
- a backplate, the backplate defined arranged with a receiving cavity;
- a reflector, the reflector arranged in the receiving cavity;
- a light guide plate, the light guide plate located in the receiving cavity, wherein the light guide plate is arranged on the reflector, the light guide plate comprises a light guide plate body part and at least one light guide plate extension part connected with the light guide plate body part, and the light guide plate body part is located in the display area, the light guide plate extension part is located in the frame area;
- a light source, the light source located in the receiving cavity, wherein the light source is located between the light guide plate and the backplate, and the light source is located on the reflector, the light source is located in the frame area; and
- an optical diaphragm, the optical diaphragm located in the receiving cavity, wherein the optical diaphragm is arranged on a side of the light guide plate away from the reflector, the optical diaphragm comprises a diaphragm body part and at least one diaphragm extension part connected with the diaphragm body part, the diaphragm body part is located in the display area, and the diaphragm extension part is located in the frame area, the diaphragm extension part is engaged and connected with the light guide plate extension part.

Alternatively, in some embodiments of the present application, the backplate comprises a bottom plate and a plurality of side walls arranged on the bottom plate, the bottom plate is located in the display area and the frame area, the plurality of the side walls are located in the frame area, the receiving cavity is defined and surrounded by the bottom plate and the plurality of the side walls, the receiving cavity comprises at least one limiting groove, and the at least one limiting groove is defined on the side walls, the diaphragm extension part and the light guide plate extension part are located in the limiting groove.

Alternatively, in some embodiments of the present application, the light guide plate extension part is arranged with a receiving part, a side of the diaphragm extension part close to the light guide plate is arranged with a buckle engaged with the receiving part, and/or, a side of the light guide plate extension part close to the optical diaphragm is arranged with a protrusion, the diaphragm extension part is arranged with a storage part, and the protrusion is engaged with the storage part.

Alternatively, in some embodiments of the present application, the receiving part comprises at least one of a through hole and a clamping groove, and/or, the storage part comprises at least one of a through hole and a clamping groove.

Alternatively, in some embodiments of the present application, the diaphragm extension part is bent towards the light guide plate to form the buckle.

Alternatively, in some embodiments of the present application, the light guide plate extension part is bent towards a side of the optical diaphragm to form the protrusion.

Alternatively, in some embodiments of the present application, a thickness of the light guide plate extension part is less than a thickness of the light guide plate body part, and a height of the limiting groove is less than a thickness of the side walls.

Alternatively, in some embodiments of the present application, each of the side walls is defined with a plurality of limiting grooves spaced apart, the light guide plate comprises a plurality of light guide plate extension parts, the plurality of the light guide plate extension parts are arranged spaced apart on a side of the light guide plate, the optical diaphragm comprises a plurality of diaphragm extension parts, and the plurality of the diaphragm extension parts are arranged spaced apart on a side of the optical diaphragm, each of the light guide plate extension parts and each of the diaphragm extension parts are engaged in one of the limiting grooves.

Alternatively, in some embodiments of the present application, each of the opposite side walls is respectively provided with one of the limiting grooves, the light guide plate comprises two light guide plate extension parts, the two light guide plate extension parts are respectively arranged on two opposite sides of the light guide plate, the optical diaphragm comprises two diaphragm extension parts, and the two diaphragm extension parts are respectively arranged on two opposite sides of the optical diaphragm, each of the light guide plate extension parts and each of the diaphragm extension parts are engaged in one of the limiting grooves.

Alternatively, in some embodiments of the present application, each of the side walls comprises a retaining wall part and supporting parts connected with the retaining wall part, the supporting part is located on a side of the retaining wall part close to the display area, and a side of the supporting part away from the bottom plate and a side of the retaining wall part away from the bottom plate form a step shape, the light source, the reflector, the optical diaphragm, and the light guide plate are arranged between the supporting part and the bottom plate, a orthographic projection of at least one of the supporting parts on the bottom plate coincides with a orthographic projection of the diaphragm extension part on the bottom plate and a orthographic projection of the light guide plate extension part on the bottom plate.

The present application provides a display device. The display device comprises a display area and a frame area arranged around the display area. The display device comprises a backplate, a light guide plate, and an optical diaphragm. A receiving cavity is arranged in the backplate. A reflector is arranged in the receiving cavity. The light guide plate is located in the receiving cavity. The light guide plate comprises a light guide plate body part and at least one light guide plate extension part connected with the light guide plate body part. The light guide plate body part is located in the display area. The light guide plate extension part is located in the frame area. The light source is located in the receiving cavity, the light source is located between the light guide plate and the backplate, and the light source is located on the reflector, and the light source is located in the frame area. The optical diaphragm is arranged on the side of the light guide plate away from the reflector and located in the receiving cavity. The optical diaphragm comprises a diaphragm body part and at least one diaphragm extension part connected with the diaphragm body part. The diaphragm body part is located in the display area, and the diaphragm extension part is located in the frame area, and the diaphragm extension part is engaged and connected with the light guide plate extension part. In the present application, by clamping and connecting the diaphragm extension part and the light guide plate extension part in the frame area, the light guide plate and the optical diaphragm are avoided from loosening, and the diaphragm extension part and the light guide plate extension part are prevented from occupying the area of the effective display area, so as to improve a display effect of the display device.

BRIEF DESCRIPTION OF DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

DETAILED DESCRIPTION OF PREFERRED EMBODIMENTS

Figure 1:
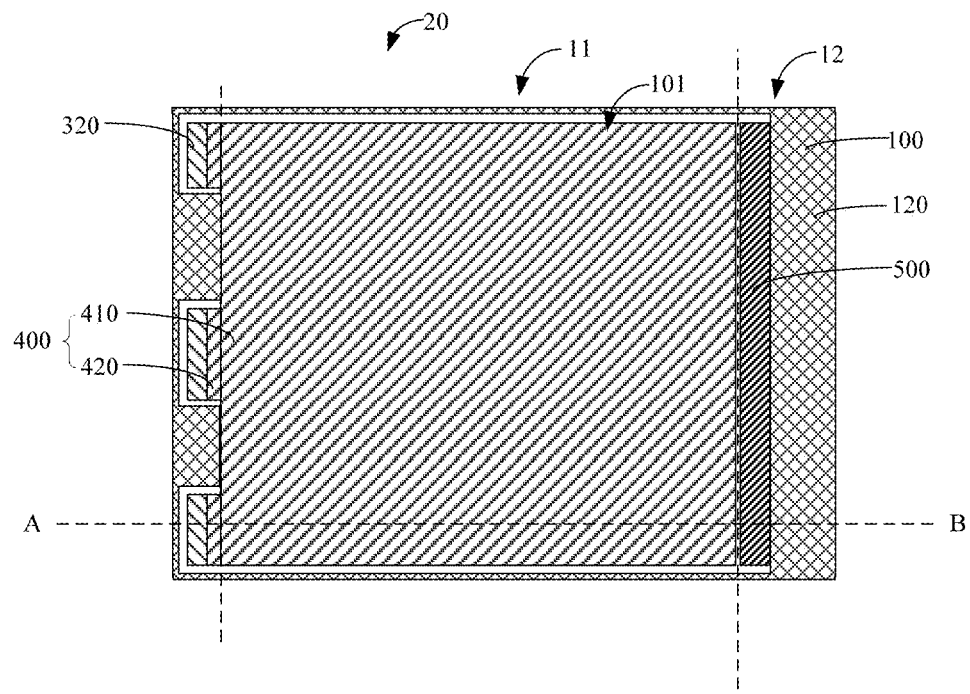
FIG. 1 is a schematic plan view of a backlight module provided by the embodiments of the present application.

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application. In addition, it should be understood that the specific embodiments described herein are only used to illustrate and explain the present application and are not used to limit the present application. In the present application, in an absence of a contrary explanation, the location words used, such as "up" and "down", usually refer to the up and down under the actual use or working state of the device, specifically the drawing direction in the attached drawings. The "inside" and "outside" are for the contour of the device. In the present application, "reaction" can be a chemical reaction or a physical reaction.

The present application provides a display device, which comprises a display area and a frame area arranged around the display area. The display device comprises a backplate, a reflector, a light source, a light guide plate, and an optical diaphragm. A receiving cavity is defined in the backplate. The reflector is located in the receiving cavity. The light guide plate is located in the receiving cavity, and the light guide plate is arranged on the reflector. The light guide plate comprises a light guide plate body part and at least one light guide plate extension part connected with the light guide plate body part. The light guide plate body part is located in the display area, the light guide plate extension part is located in the frame area. The light source is located in the receiving cavity, the light source is located between the light guide plate and the backplate, the light source is located on the reflector, and the light source is located in the frame area. The optical diaphragm is arranged on a side of the light guide plate away from the reflector and located in the receiving cavity, and the optical diaphragm comprises a diaphragm body part and at least one diaphragm extension part connected with the diaphragm body part. The diaphragm body part is located in the display area. The diaphragm extension part is located in the frame area, and the diaphragm extension part is engaged and connected with the extension part of the light guide plate.

In the present application, by clamping and connecting the diaphragm extension part and the light guide plate extension part in the frame area, it is possible to avoid the light guide plate and the optical diaphragm from loosening, and at a same time, the diaphragm extension part and the light guide plate extension part are prevented from occupying an area of the effective display area, so as to improve a display effect of the display device.

Figure 2:
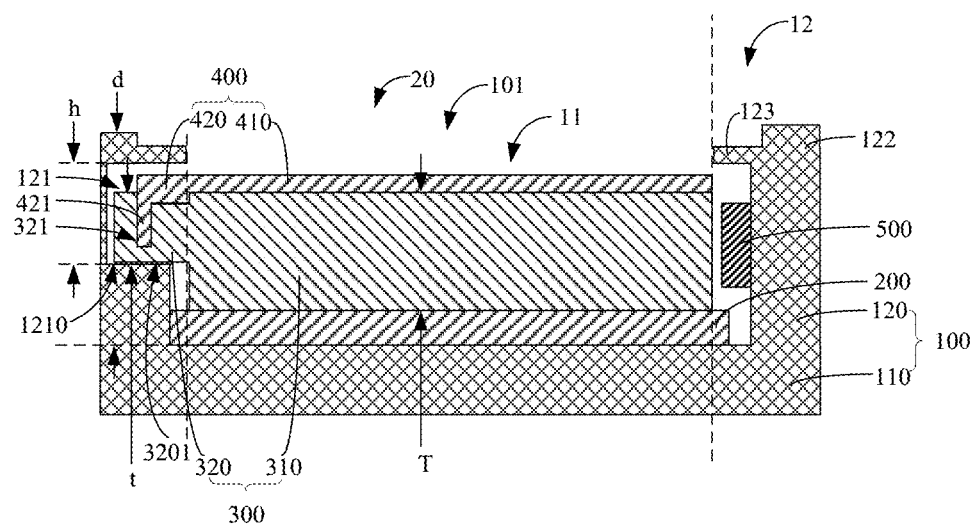
FIG. 2 is a first structural diagram along a line AB of the backlight module provided in FIG. 1.
Figure 3:
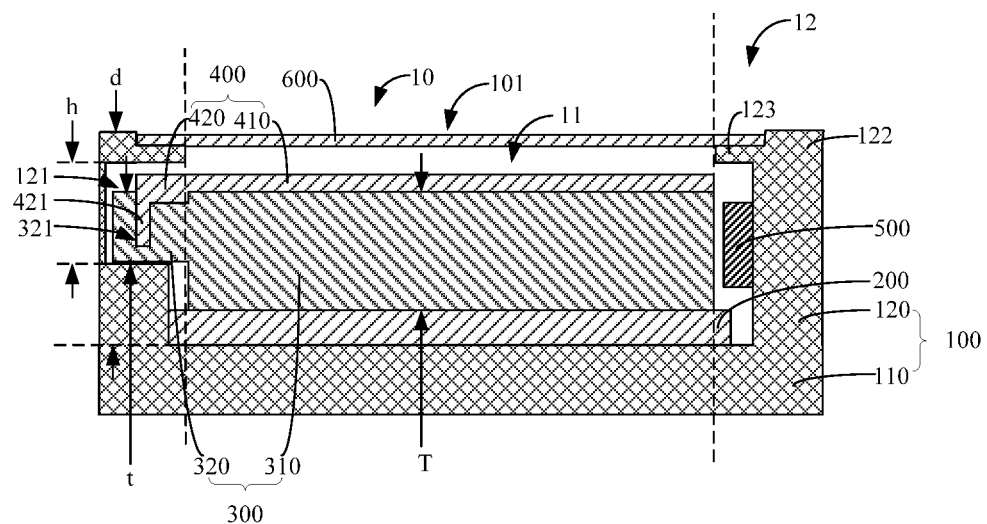
FIG. 3 is a schematic structural diagram of a display panel provided by the embodiments of the present application

The following are detailed descriptions:

Referring to FIG. 1 to FIG. 3, the present application provides a display device 10. The display device 10 comprises a display area 11 and a frame area 12 arranged around the display area 11. The display device 10 comprises a backplate 100, a reflector 200, a light guide plate 300, an optical diaphragm 400, a light source 500, and a display panel 600.

The backplate 100 is defined with a receiving cavity 101, the receiving cavity is located in the display area 11 and the frame area 12. The receiving cavity 101 is used to place a film structure of the display device 10.

In one embodiment, the backplate 100 comprises a bottom plate 110 and a plurality of side walls 120 arranged on the bottom plate 110. The bottom plate 110 is located in the display area 11 and the frame area 12. The plurality of the side walls 120 are located in the frame area 12. The receiving cavity 101 is defined and surrounded by the bottom plate 110 and the plurality of the side walls 120. The receiving cavity 101 is located in the display area 11 and the frame area 12. The receiving cavity 101 comprises at least one limiting groove 121. At least one limiting groove 121 is defined by the side walls 120. As shown in FIG. 2, the limiting groove 121 includes a first wall 1210 parallel to the bottom plate 110, and the light guide plate extension part 320 extends into the limiting groove 121. One surface 3201 of the light guide plate extension part 320 close to the bottom plate 110 is in contact with the first wall 1210.

In the present application, at least one limiting groove 121 is arranged on the side walls 120, and the diaphragm extension part 420 and the light guide plate extension part 320 are fixed through the limiting groove 121, that is, the optical diaphragm 400 and the light guide plate 300 are fixed, so as to avoid an up-and-down movement of the light guide plate 300 and the optical diaphragm 400, so as to ensure the display effect of the display device 10.

In one embodiment, each of the side walls 120 comprises a retaining wall portion 122 and a supporting portion 123 connected with the retaining wall portion 122. The supporting portion 123 is located on a side of the retaining wall portion 122 close to the display area 11. A side of the supporting part 123 away from the bottom plate 110 and a side of the retaining wall part 122 away from the bottom plate 110 form a step shape. And the side of the supporting part 123 away from the bottom plate 110 is closer to the bottom plate 110 than the side of the retaining wall part 122 away from the bottom plate 110. An orthographic projection of at least one supporting part 123 on the bottom plate 110 coincides with an orthographic projection of the diaphragm extension 420 on the bottom plate 110 and an orthographic projection of the light guide plate extension 320 on the bottom plate 110.

In the present application, the side of the supporting part 123 away from the bottom plate 110 and the side of the retaining wall part 122 away from the bottom plate 110 are arranged to form the step shape, so that the display panel 600 can be placed on the supporting part 123. Due to the clamping of the retaining wall, the display panel 600 can be prevented from moving along an X-axis, that is, the display panel 600 can be prevented from moving left and right, so as to ensure the display effect of the display device 10.

The reflector 200 is arranged on the bottom plate 110.

The light guide plate 300 is located in the receiving cavity 101. The light guide plate 300 comprises a light guide plate body part 310 and at least one light guide plate extension part 320 connected with the light guide plate body part 310. The light guide plate body part 310 is located in the display area 11. The light guide plate extension part 320 is located in the frame area 12. Specifically, the light guide plate 300 is arranged on a side of the reflector 200 away from the bottom plate 110. The light guide plate extension part 320 is located in the limiting groove 121. The light guide plate 300 is arranged between the bottom plate 110 and the supporting part 123.

In one embodiment, a thickness t of the light guide plate extension part 320 is less than a thickness T of the light guide plate body part 310. A height h of the limiting groove 121 is less than a thickness d of the side wall 120.

In the present application. The thickness t of the light guide plate extension part 320 is set to be less than the thickness T of the light guide plate body part 300, so that when the light guide plate extension part 320 is bent to form a protrusion 322, it is easy to bend and not easy to break, so as to improve a yield of the display device 10 and reduce cost. The height h of the limiting groove 121 is set to be less than the thickness d of the side wall 120, so that the limiting groove 121 can not only fix the light guide plate 300 and the optical diaphragm 400, but also avoid a collapse of the side walls 120, so as to ensure the display effect of the display device 10.

The light source 500 is located in the receiving cavity. The light source 500 is located between the light guide plate 300 and the backplate 100, and the light source 500 is located on the reflector 200. The light source 500 is located in the frame area 12. Specifically, the light source 500 is arranged on one of the side walls 120, and the light source 500 is located between the light guide plate extension part 320 and the side wall 120. The light source 500 is located in the frame area 12. The light source 500 is located on the reflector 200.

The optical diaphragm 400 is arranged on a side of the light guide plate 300 away from the reflector 200, and is located in the receiving cavity 101, and is located between the supporting part 123 and the light guide plate 300. The optical diaphragm 400 comprises a diaphragm body part 410 and at least one diaphragm extension part 420 connected with the diaphragm body part 410. The diaphragm body part 410 is located in the display area 11. The diaphragm extension part 420 is located in the frame area 12. The diaphragm extension part 420 is engaged and connected with the light guide plate extension part 320.

The backplate 100, the reflector 200, the light guide plate 300, and the optical diaphragm 400 constitute a backlight module 20.

In one embodiment, the optical diaphragm 400 comprises multiple layers.

In the present application, the light guide plate extension part 320 is arranged on the light guide plate 300. The diaphragm extension part 420 is engaged and connected with the light guide plate extension part 320 and is arranged on the optical diaphragm 400, and the light guide plate extension part 320 and the diaphragm extension part 420 are located in the frame area 12, so that the light guide plate 300 and the optical diaphragm 400 do not occupy the display area 11 of the display device 10 while avoiding a left-and-right movement of the light guide plate 300 and the optical diaphragm 400, so as to ensure the display effect of the display device 10.

In the present application, the light guide plate extension part 320 and the diaphragm extension part 420 are arranged in the frame area 12, and the light guide plate extension part 320 is engaged with the diaphragm extension part 420, so that the light guide plate 300 and the optical diaphragm 400 can achieve a purpose of fixing the light guide plate 300 and the optical diaphragm 400 without adding a structure, reducing a thickness of the display device 10, and making the display device 10 light and thin. At a same time, the display area 11 of the display device 10 is not occupied, so as to ensure the display effect of the display device 10.

In one embodiment, the light guide plate extension part 320 is provided with a receiving part 321. The receiving part 321 is located on a side of the light guide plate extension part 320 away from the bottom plate 110. A side of the diaphragm extension part 420 close to the light guide plate 300 is provided with a buckle 421 engaged with the receiving part 321. Specifically, the receiving part 321 is a clamping groove. The diaphragm extension part 420 is bent towards the light guide plate 300 to form the buckle 421. The clamping groove is engaged with the buckle 421.

In the present application, the light guide plate extension part 320 is provided with the receiving part 321. The side of the diaphragm extension part 420 close to the light guide plate 300 is provided with a buckle 421 and engaged with the receiving part 321. And the receiving part 321 and the buckle 421 are located in the frame area 12. So that the light guide plate 300 and the optical diaphragm 400 can achieve the purpose of fixing the light guide plate 300 and the optical diaphragm 400 without adding a structure and reduce the thickness of the display device 10. Thus, the thickness of the display device 10 is reduced, the display device 10 is light and thin, and the display area 11 of the display device 10 is not occupied, so as to ensure the display effect of the display device 10.

In one embodiment, each of the side walls 120 is defined with a plurality of limiting grooves 121 spaced apart. The light guide plate 300 comprises a plurality of light guide plate extension parts 320. The plurality of the light guide plate extension parts 320 are arranged spaced apart on a side of the light guide plate 300. The optical diaphragm 400 comprises a plurality of diaphragm extension parts 420. The plurality of the diaphragm extension parts 420 are arranged spaced apart on a side of the optical diaphragm 400. Each of the light guide plate extension parts 320 and each of the diaphragm extension parts 420 are engaged in one of the limiting grooves 121.

It should be noted that FIG. 1 is only a brief schematic diagram. Although the supporting part 123 of the side walls 120 and the display panel 600 are not shown in FIG. 1, it does not mean that there is none.

In the present application, the plurality of limiting grooves 121 spaced apart are arranged on each of the side walls 120, which improves a stability of fixing the light guide plate 300 and the optical diaphragm 400, further avoids a movement of the light guide plate 300 and the optical diaphragm 400, and further ensures the display effect of the display device 10.

In one embodiment, each of the opposite side walls 120 is respectively provided with one limiting groove 121. The light guide plate 300 comprises two light guide plate extension parts 320. The two light guide plate extension parts 320 are respectively arranged on two opposite sides of the light guide plate 300. The optical diaphragm 400 comprises two diaphragm extension parts 420. The two diaphragm extension parts 420 are respectively arranged on two opposite sides of the optical diaphragm 400. Each of the light guide plate extension parts 320 and each of the diaphragm extension parts 420 are engaged in one of the limiting grooves 121.

The display panel 600 is arranged on the supporting part 123 and is located between the retaining wall parts 122.

Figure 4:
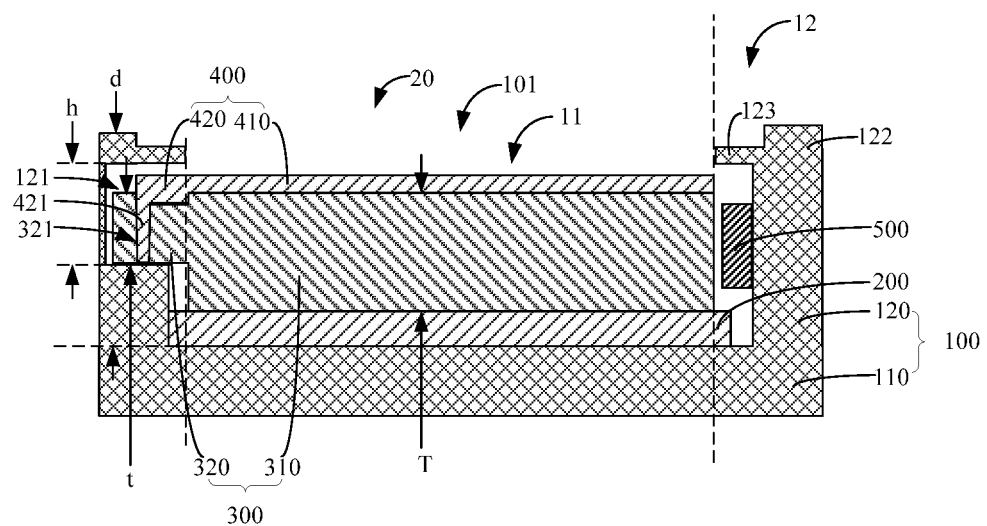
FIG. 4 is a schematic diagram of a second structure along a line AB of the backlight module provided in FIG. 1.

Referring to FIG. 4, it should be noted that a difference between a second structure and the first structure is:

The receiving part 321 is a through hole. The clamping groove is engaged with the buckle 421.

In the present application, the receiving part 321 is defined as a through hole, which further improves the stability of fixing the light guide plate 300 and the optical diaphragm 400, further avoids the movement of the light guide plate 300 and the optical diaphragm 400, and further ensures the display effect of the display device 10.

In another embodiment, the receiving part 321 comprises a through hole and a clamping groove.

Figure 5:
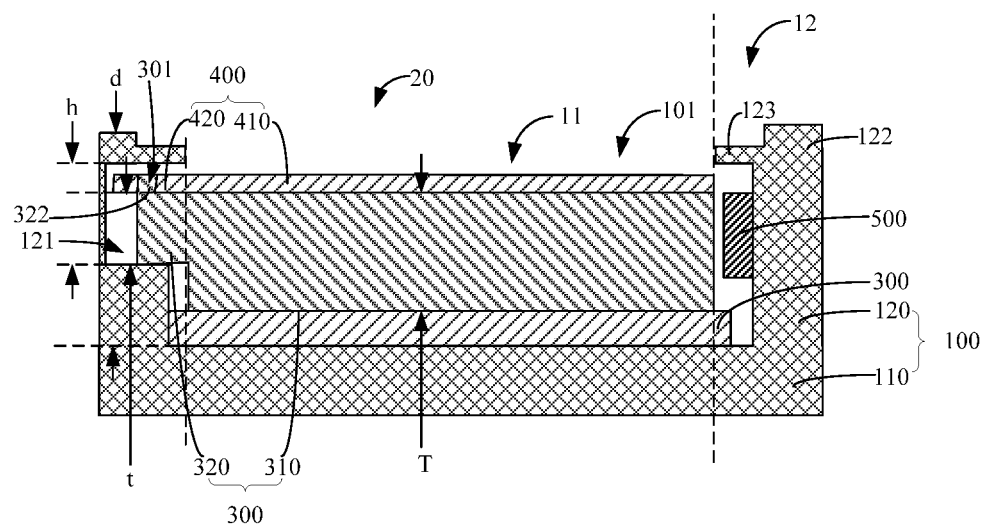
FIG. 5 is a third structural diagram along a line AB of the backlight module provided in FIG. 1.

Refer to FIG. 5. It should be noted that a difference between a third structure and the first structure is:

A protrusion 322 is arranged on a side of the light guide plate extension part 320 close to the optical diaphragm 400, and a storage part 301 is arranged on the diaphragm extension part 420. The protrusion 322 is engaged with the storage part 301. Specifically, the storage part 301 is a through hole. The light guide plate extension part 320 is bent towards a side of the optical diaphragm 400 to form the protrusion 322.

In the present application, the protrusion 322 is arranged on a side of the light guide plate extension part 320 close to the optical diaphragm 400, and the storage part 301 is arranged on the diaphragm extension part 420, and the storage part 301 is a through hole. The light guide plate extension part 320 bends towards a side of the optical diaphragm 400 to form the protrusion 322 engaged with the through hole, so that the light guide plate 300 and the optical diaphragm 400 can achieve the purpose of fixing the light guide plate 300 and the optical diaphragm 400 without adding a structure. The thickness of the display device 10 is reduced, making the display device 10 light and thin without occupying the display area 11 of the display device 10, so as to ensure the display effect of the display device 10.

In another embodiment, the protrusion 322 on the light guide plate extension part 320 can be formed without bending its side towards the optical diaphragm 400, but can be directly arranged on the light guide plate extension part 320, where a side of the protrusion 322 away from the display area 11 and a side of the light guide plate extension part 320 away from the display area 11 form a step shape.

In the present application, the light guide plate 300 is relatively brittle and easy to break when bending. The protrusion 322 is directly arranged on the light guide plate extension part 320 to avoid the problem of cracking when bending the light guide plate 300, so as to ensure the yield of the display device 10 and the yield of the display device 10.

Figure 6:
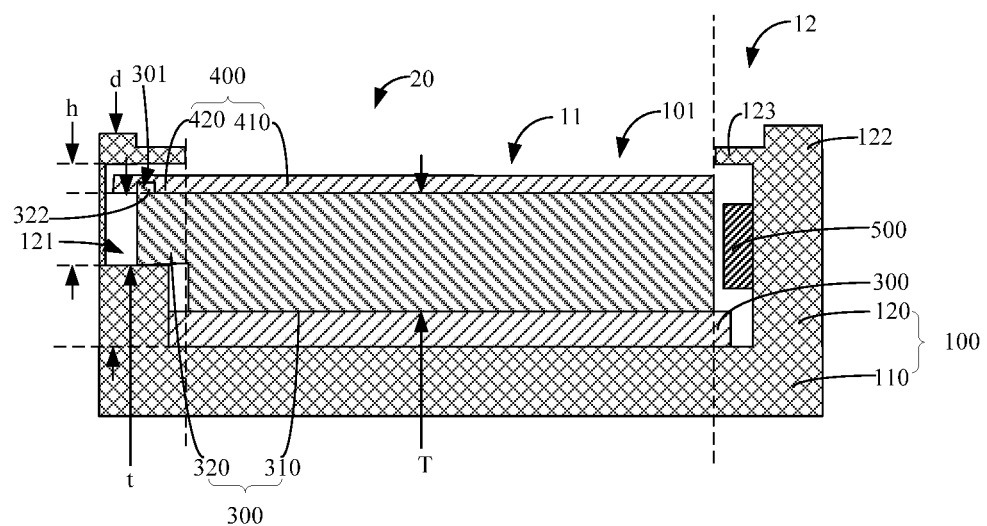
FIG. 6 is a fourth structural diagram along a line AB of the backlight module provided in FIG. 1.

Referring to FIG. 6. It should be noted that a difference between a fourth structure and the third structure is:

The storage part 301 is a groove.

In the present application, a protrusion 322 is arranged on the side of the light guide plate extension part 320 close to the optical diaphragm 400, a storage part 301 is arranged on the diaphragm extension part 420, and the storage part 301 is a groove. The light guide plate extension part 320 is provided with the protrusion 322 engaged with the through hole, so that the optical diaphragm 400 and the light guide plate 300 are fixed without occupying the display area 11 of the display device 10, so as to ensure the display effect of the display device 10.

In another embodiment, the storage part 301 comprises a through hole and a groove.

The present application provides a display device 10. The display device 10 comprises a display area 11 and a frame area 12 arranged around the display area 11. The display device 10 comprises a backplate 100, a light guide plate 300, and an optical diaphragm 400. The backplate 100 is defined with a receiving cavity 101. The receiving cavity 101 is located in the display area 11 and the frame area 12. The reflector 200 is located in the receiving cavity 101. The light guide plate 300 is located in the receiving cavity 101, and the light guide plate 300 is located on the reflector 200. The light guide plate 300 comprises a light guide plate body part 310 and at least one light guide plate extension part 320 connected with the light guide plate body part 310. The light guide plate body part 310 is located in the display area 11. The light guide plate extension part 320 is located in the frame area 12. The light source 500 is arranged between the light guide plate 300 and the backplate 100, the light source 500 is located above the reflector 200. The optical diaphragm 400 is arranged on a side of the light guide plate 300 away from the reflector and in the receiving cavity 101. The optical diaphragm 400 comprises a diaphragm body part 410 and at least one diaphragm extension part 420 connected with the diaphragm body part 410. The diaphragm body part 410 is located in the display area 11, the diaphragm extension part 420 is located in the frame area 12, and the diaphragm extension part 420 is engaged with and connected with the light guide plate extension part 320. In the present application, by clamping and connecting the diaphragm extension part 420 and the light guide plate extension part 320 in the frame area 12, the light guide plate 300 and the optical diaphragm 400 are avoided from loosening, and the diaphragm extension part 420 and the light guide plate extension part 320 are prevented from occupying the area of the effective display area, so as to improve a display effect of the display device 10.

The present application has been described by the relevant embodiments, however, the above embodiments are only examples of the implementation of the present invention. It must be noted that the disclosed embodiments do not limit the scope of the present invention. On the contrary, the modification and equalization of the spirit and scope included in the claims are included in the scope of the invention.

What is claimed is:

1. A display device, wherein the display device comprises a display area and a frame area arranged around the display area, comprising:

a backplate, the backplate defined with a receiving cavity;
a reflector, the reflector arranged in the receiving cavity;

a light guide plate, the light guide plate located in the receiving cavity, and the light guide plate is arranged on the reflector, the light guide plate comprises a light guide plate body part and at least one light guide plate extension part connected with the light guide plate body part, the light guide plate body part is located in the display area, the light guide plate extension part is located in the frame area;

a light source, the light source located in the receiving cavity, the light source is located between the light guide plate and the backplate, and the light source is located on the reflector, the light source is located in the frame area;

an optical diaphragm, the optical diaphragm located in the receiving cavity, the optical diaphragm is arranged on a side of the light guide plate away from the reflector, the optical diaphragm comprises a diaphragm body part and at least one diaphragm extension part connected with the diaphragm body part, the diaphragm body part is located in the display area, the diaphragm extension part is located in the frame area, the diaphragm extension part is engaged with and connected with the light guide plate extension part; and a display panel, the display panel arranged on a side of the backplate away from the optical diaphragm;

wherein the backplate comprises a bottom plate and a plurality of side walls arranged on the bottom plate, the bottom plate and the plurality of side walls are enclosed to form the receiving cavity, at least one limiting groove with an opening facing the receiving cavity is defined by at least one of the plurality of side walls, the at least one limiting groove comprises a first wall parallel to the bottom plate, the light guide plate extension part extends into the at least one limiting groove, and a surface of the light guide plate extension part close to the bottom plate is in contact with the first wall; and the light guide plate extension part is provided with a clamping groove located in one of the at least one limiting groove, an opening of the clamping groove faces the diaphragm extension part, the clamping groove passes through at least a part of the light guide plate extension part along a thickness direction of the light guide plate, the diaphragm extension part comprises a buckle, the buckle protrudes from a surface of the diaphragm extension part facing the light guide plate, and the buckle is engaged with the clamping groove along the thickness direction of the light guide plate.

2. The display device according to claim 1, wherein the bottom plate is located in the display area and the frame area, and the plurality of the side walls are located in the frame area.

3. The display device according to claim 2, wherein a thickness of the light guide plate extension part is less than a thickness of the light guide plate body part, and a height of the limiting groove is less than a thickness of the side wall.

4. The display device according to claim 2, wherein each of the side walls is defined with a plurality of limiting grooves spaced apart, the light guide plate comprises a plurality of light guide plate extension parts, the plurality of the light guide plate extension parts are arranged spaced apart on a side of the light guide plate, the optical diaphragm comprises a plurality of diaphragm extension parts, and the plurality of the diaphragm extension parts are arranged spaced apart on a side of the optical diaphragm, each of the light guide plate extension parts and each of the diaphragm extension parts are engaged in one of the limiting grooves.

5. The display device according to claim 2, wherein each of the opposite side walls is respectively provided with one of the limiting grooves, the light guide plate comprises two light guide plate extension parts, the two light guide plate extension parts are respectively arranged on two opposite sides of the light guide plate, the optical diaphragm comprises two diaphragm extension parts, and the two diaphragm extension parts are respectively arranged on two opposite sides of the optical diaphragm, each of the light guide plate extension parts and each of the diaphragm extension parts are engaged in one of the limiting grooves.

6. The display device according to claim 2, wherein each of the side walls comprises a retaining wall part and supporting parts connected with the retaining wall part, the supporting part is located on a side of the retaining wall part close to the display area, and a side of the supporting part away from the bottom plate and a side of the retaining wall part away from the bottom plate form a step shape, the light source, the reflector, the optical diaphragm, and the light guide plate are arranged between the supporting part and the bottom plate, an orthographic projection of at least one of the supporting parts on the bottom plate coincides with an orthographic projection of the diaphragm extension part on the bottom plate and an orthographic projection of the light guide plate extension part on the bottom plate.

7. The display device according to claim 6, wherein the display panel is arranged on the supporting parts.

8. The display device according to claim 1, wherein the clamping groove is horizontally spaced apart from an edge of the light guide plate extension part away from the light guide plate body part.

9. The display device according to claim 1, wherein the light guide plate extension part protrudes from a side surface of the light guide plate body part.

10. A display device, wherein the display device comprises a display area and a frame area arranged around the display area, comprising:

a backplate, the backplate defined arranged with a receiving cavity;

a reflector, the reflector arranged in the receiving cavity;

a light guide plate, the light guide plate located in the receiving cavity, wherein the light guide plate is arranged on the reflector, the light guide plate comprises a light guide plate body part and at least one light guide plate extension part connected with the light guide plate body part, and the light guide plate body part is located in the display area, the light guide plate extension part is located in the frame area;

a light source, the light source located in the receiving cavity, wherein the light source is located between the light guide plate and the backplate, and the light source is located on the reflector, the light source is located in the frame area; and an optical diaphragm, the optical diaphragm located in the receiving cavity, wherein the optical diaphragm is arranged on a side of the light guide plate away from the reflector, the optical diaphragm comprises a diaphragm body part and at least one diaphragm extension part connected with the diaphragm body part, the diaphragm body part is located in the display area, and the diaphragm extension part is located in the frame area, the diaphragm extension part is engaged and connected with the light guide plate extension part;

wherein the backplate comprises a bottom plate and a plurality of side walls arranged on the bottom plate, the bottom plate and the plurality of side walls are enclosed to form the receiving cavity, at least one limiting groove with an opening facing the receiving cavity is defined by at least one of the plurality of side walls, the at least one limiting groove comprises a first wall parallel to the bottom plate, the light guide plate extension part extends into the at least one limiting groove, and a surface of the light guide plate extension part close to the bottom plate is in contact with the first wall; and the light guide plate extension part is provided with a clamping groove located in one of the at least one limiting groove, an opening of the clamping groove faces the diaphragm extension part, the clamping groove passes through at least a part of the light guide plate extension part along a thickness direction of the light guide plate, the diaphragm extension part comprises a buckle, the buckle protrudes from a surface of the diaphragm extension part facing the light guide plate, and the buckle is engaged with the clamping groove along the thickness direction of the light guide plate.

11. The display device according to claim 10, wherein the bottom plate is located in the display area and the frame area, and the plurality of the side walls are located in the frame area.

12. The display device according to claim 11, wherein a thickness of the light guide plate extension part is less than a thickness of the light guide plate body part, and a height of the limiting groove is less than a thickness of the side walls.

13. The display device according to claim 11, wherein each of the side walls is defined with a plurality of limiting grooves spaced apart, the light guide plate comprises a plurality of light guide plate extension parts, the plurality of the light guide plate extension parts are arranged spaced apart on a side of the light guide plate, the optical diaphragm comprises a plurality of diaphragm extension parts, and the plurality of the diaphragm extension parts are arranged spaced apart on a side of the optical diaphragm, each of the light guide plate extension parts and each of the diaphragm extension parts are engaged in one of the limiting grooves.

14. The display device according to claim 11, wherein each of the opposite side walls is respectively provided with one of the limiting grooves, the light guide plate comprises two light guide plate extension parts, the two light guide plate extension parts are respectively arranged on two opposite sides of the light guide plate, the optical diaphragm comprises two diaphragm extension parts, and the two diaphragm extension parts are respectively arranged on two opposite sides of the optical diaphragm, each of the light guide plate extension parts and each of the diaphragm extension parts are engaged in one of the limiting grooves.

15. The display device according to claim 11, wherein each of the side walls comprises a retaining wall part and supporting parts connected with the retaining wall part, the supporting part is located on a side of the retaining wall part close to the display area, and a side of the supporting part away from the bottom plate and a side of the retaining wall part away from the bottom plate form a step shape, the light source, the reflector, the optical diaphragm, and the light guide plate are arranged between the supporting part and the bottom plate, a orthographic projection of at least one of the supporting parts on the bottom plate coincides with a orthographic projection of the diaphragm extension part on the bottom plate and a orthographic projection of the light guide plate extension part on the bottom plate.

16. The display device according to claim 10, wherein the clamping groove is horizontally spaced apart from an edge of the light guide plate extension part away from the light guide plate body part.

17. The display device according to claim 10, wherein the light guide plate extension part protrudes from a side surface of the light guide plate body part.

* * * * *